(12) United States Patent
Lohiya et al.

(10) Patent No.: US 10,476,770 B2
(45) Date of Patent: Nov. 12, 2019

(54) PACKET LOSS DETECTION FOR USER DATAGRAM PROTOCOL (UDP) TRAFFIC

(71) Applicant: Juniper Networks, Inc., Sunnyvale, CA (US)

(72) Inventors: Anil K. Lohiya, Cupertino, CA (US); Nitin Kumar, Fremont, CA (US); Jagdeep Channa, Brampton (CA)

(73) Assignee: Juniper Networks, Inc., Sunnyvale, CA (US)

(*) Notice: Subject to any disclaimer, the term of this patent is extended or adjusted under 35 U.S.C. 154(b) by 36 days.

(21) Appl. No.: 15/858,965

(22) Filed: Dec. 29, 2017

(65) Prior Publication Data

US 2019/0207835 A1 Jul. 4, 2019

(51) Int. Cl.
*H04L 12/26* (2006.01)
*H04L 12/851* (2013.01)
*H04L 29/06* (2006.01)

(52) U.S. Cl.
CPC ........ *H04L 43/0835* (2013.01); *H04L 43/028* (2013.01); *H04L 43/04* (2013.01); *H04L 43/067* (2013.01); *H04L 43/0829* (2013.01); *H04L 43/0852* (2013.01); *H04L 47/2408* (2013.01); *H04L 63/0236* (2013.01); *H04L 69/164* (2013.01)

(58) Field of Classification Search
CPC ... H04L 43/0835; H04L 43/04; H04L 43/067; H04L 47/2408; H04L 63/0236; H04L 69/164
See application file for complete search history.

(56) References Cited

U.S. PATENT DOCUMENTS

| 2008/0049641 A1* | 2/2008 | Edwards | H04L 12/66 370/253 |
| 2012/0236734 A1* | 9/2012 | Sampath | H04L 12/413 370/252 |

OTHER PUBLICATIONS

Extended European Search Report for Application No. EP18197687.9, dated Mar. 21, 2019, 11 pages.
Westerlund M., et al., "Internet Engineering Task Force (IETF)," Aug. 2014, 58 pages, XP055133663, [retrieved on Aug. 6, 2014] Retrieved from the Internet: [URL: http://www.rfc-editor.org/rfc/pdfrfc/rfc6679.txt.pdf].

* cited by examiner

*Primary Examiner* — Kent K Krueger
(74) *Attorney, Agent, or Firm* — Harrity & Harrity, LLP (57) ABSTRACT

A network device may receive user datagram protocol (UDP) packets associated with an internet protocol (IP) session. The network device may apply a first firewall filter by setting one or more bits of each UDP packet to particular bit values to allow each UDP packet to be identified in association with the first firewall filter. The network device may update, each time a UDP packet is received, a first packet counter to account for a total number of UDP packets to which the first firewall filter has been applied. The network device may provide each UDP packet to another network device. The other network device may update a second packet counter. The network device and the other network device may provide the first packet counter and the second packet counter to a server device to cause the server device to determine packet loss information for the IP session.

20 Claims, 6 Drawing Sheets

PACKET LOSS DETECTION FOR USER DATAGRAM PROTOCOL (UDP) TRAFFIC

BACKGROUND

Packet loss occurs when one or more packets of data travelling across a computer network fail to reach their destination. Packet loss is typically caused by network congestion, and may be measured as a percentage of packets lost with respect to packets sent.

SUMMARY

According to some possible implementations, a network device may receive user datagram protocol (UDP) traffic flow associated with an internet protocol (IP) session. The UDP traffic flow may include a set of UDP packets. The network device may apply a first firewall filter to each UDP packet of the set of UDP packets, where, when applying the first firewall filter, the network device may set one or more bits of each UDP packet of the set of UDP packets to one or more particular bit values to allow each UDP packet to be identified in association with the first firewall filter. The first firewall filter may be applied during a first time period. The network device may update, each time a UDP packet of the set of UDP packets is received, a first packet counter to account for a total number of UDP packets to which the first firewall filter has been applied. The network device may provide, to another network device, each UDP packet of the set of UDP packets. The other network device may update a second packet counter to account for a total number of UDP packets to which the first firewall filter has been applied and which have been received by the other network device. The network device may provide the first packet counter to a server device. The other network device may provide the second packet counter to the server device. At a threshold time period after the first time period, the server device may determine packet loss information for the IP session for the first time period. The server device may be unable to distinguish between packet loss and packet delay when determining the packet loss information by comparing only packet counters associated with the first firewall filter.

According to some possible implementations, a system may include a first network device, a second network device, and a server device. The first network device may receive user datagram protocol (UDP) traffic flow associated with an internet protocol (IP) session. The UDP traffic flow may include a set of UDP packets. The first network device may apply a first firewall filter to each UDP packet of the set of UDP packets, where, when applying the first firewall filter, the first network device may set one or more bits of each UDP packet of the set of UDP packets to one or more particular bit values to allow each UDP packet to be identified in association with the first firewall filter. The first firewall filter may be applied during a first time period. The network device may update, each time a UDP packet of the set of UDP packets is received, a first packet counter to account for a total number of UDP packets to which the first firewall filter has been applied. The second network device may receive, from the first network device, each UDP packet of the set of UDP packets. The second network device may update a second packet counter to account for a total number of UDP packets to which the first firewall filter has been applied and which have been received by the second network device. The server device may receive the first packet counter from the first network device. The server device may receive the second packet counter from the second network device. The server device may determine packet loss information for the IP session for the first time period based on the first packet counter and the second packet counter. The server device may be able to distinguish between packet loss and packet delay when determining the packet loss information by comparing only packet counters associated with the first firewall filter.

According to some possible implementations, a method may include receiving, by a network device, user datagram protocol (UDP) traffic flow associated with an internet protocol (IP) session. The UDP traffic flow may include a set of UDP packets. The method may include applying, by the network device, a first firewall filter to each UDP packet of the set of UDP packets. Applying the first firewall filter may include setting one or more bits of each UDP packet of the set of UDP packets to one or more particular bit values to allow each UDP packet to be identified in association with the first firewall filter, where the first firewall filter is to be applied during a first time period. The method may include updating, by the network device, each time a UDP packet of the set of UDP packets is received, a first packet counter to account for a total number of UDP packets to which the first firewall filter has been applied. The method may include providing, by the network device and to another network device, each UDP packet of the set of UDP packets. The other network device may update a second packet counter to account for a total number of UDP packets to which the first firewall filter has been applied and which have been received by the other network device. The method may include providing, by the network device, the first packet counter to a server device. The other network device may provide the second packet counter to the server device. The server device may determine packet loss information for the IP session for the first time period based on the first packet counter and the second packet counter.

DETAILED DESCRIPTION

The following detailed description of example implementations refers to the accompanying drawings. The same reference numbers in different drawings may identify the same or similar elements.

In computer networking, user datagram protocol (UDP) is one of the core members of the internet protocol (IP) suite. Computer programs may utilize UDP to send messages (e.g., datagrams) to other hosts on an IP network. Additionally, UDP provides a simple, stateless protocol that is suitable for real-time programs. However, UDP does not support a means for monitoring packet loss. This is in contrast to other IP suite protocols, such as transmission control protocol (TCP), which supports monitoring packet loss by use of acknowledgement packets (e.g., an acknowledgement packet may be sent to a sender device to alert the sender device that a packet was received).

In some situations, a program may benefit from using a stateless protocol such as UDP, but may also have a need to monitor packet loss. For example, a program that transmits real-time sensitive data may benefit from a stateless protocol such as UDP, but might also need to monitor packet loss due to the sensitive nature of the data being transmitted. However, in this case, UDP would be unable to support a means of monitoring packet loss.

Furthermore, using devices to simply count each UDP packet may be ineffective as the devices may be unable to differentiate between packet loss, packet delay, and situations where a transmitting device has stopped sending UDP packets. For example, assume a first device receives and counts ten UDP packets, and that the first device provides the ten UDP packets to a second device. Further assume the second device counts eight UDP packets, and that both devices counts are provided to a data reporting device. In this case, the data reporting device may be unable to determine whether the two packet discrepancy is caused by packet loss (e.g., the remaining two packets were lost or dropped) or by packet delay (e.g., the remaining two packets are still in the process of being transported to the second device). Additionally, there is no mechanism in UDP by which a receiver device might detect that a transmitting device has stopped sending UDP packets.

Some implementations described herein provide a first network device and a second network device with alternating firewall filters that may be used to count UDP packets, such that a data reporting device may process the packet counters to determine packet loss information for an IP session of a program using UDP. For example, the first network device may receive UDP packets associated with an IP session, and may apply a first firewall filter to each UDP packet of the set of UDP packets over a first time period. In this case, applying the first firewall filter may include setting one or more bits of each UDP packet to one or more particular bit values to allow each UDP packet to be identified in association with the first firewall filter.

Additionally, the first network device may update, each time a UDP packet of the set of UDP packets is received, a first packet counter to account for a total number of UDP packets to which the first firewall filter has been applied. Furthermore, the first network device may forward each UDP packet to the second network device, and the second network device may update a second packet counter to account for a total number of UDP packets to which the first firewall filter has been applied and which have been received by the second network device.

Additionally, the first network device may provide the first packet counter to the data reporting device and the second network device may provide the second packet counter to the data reporting device. In this case, the data reporting device may determine packet loss information for the IP session for the first time period at a threshold time period after the first time period, such as a time period after the data reporting device has started to receive packet counters associated with a second firewall filter. By comparing the packet counters reported by the first and second network devices, the data reporting device may identify the packet loss information for a particular interval during which the first firewall filter is applied.

In this way, the first network device and the second network device enable the data reporting device to report packet loss (e.g., to a client device) for an IP session of a program that is being supported with UDP. Additionally, by detecting packet loss, the first network device and the second network device improve overall stability of the IP session of the program that is being supported by UDP, alert program managers of packet loss such that issues may be corrected to minimize subsequent packet loss, conserves processing resources that might otherwise be used to resend UDP packets, and/or the like.

Figure 1A:
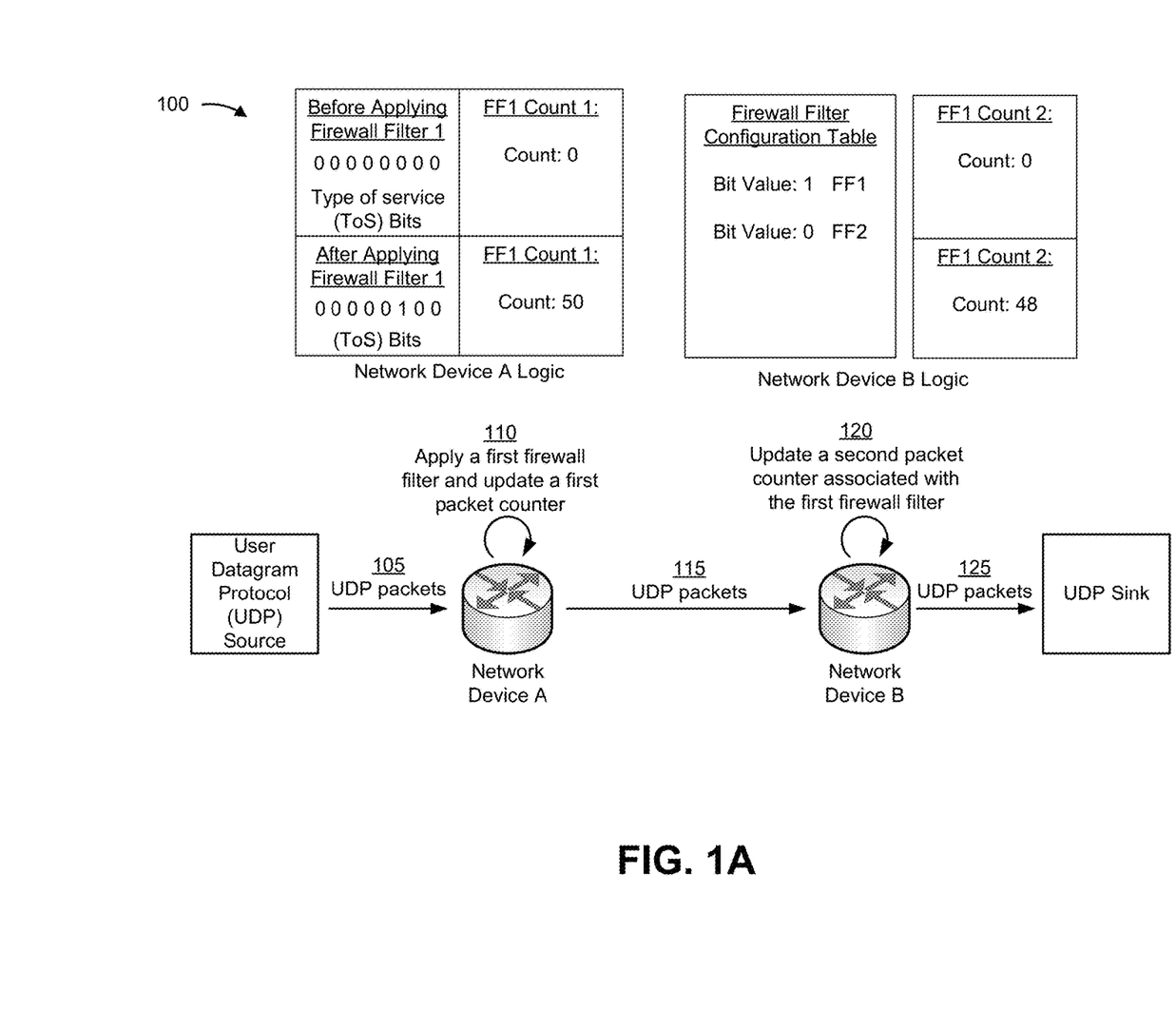
FIGS. 1A and 1B are diagrams of an overview of an example implementation described herein.
Figure 1B:
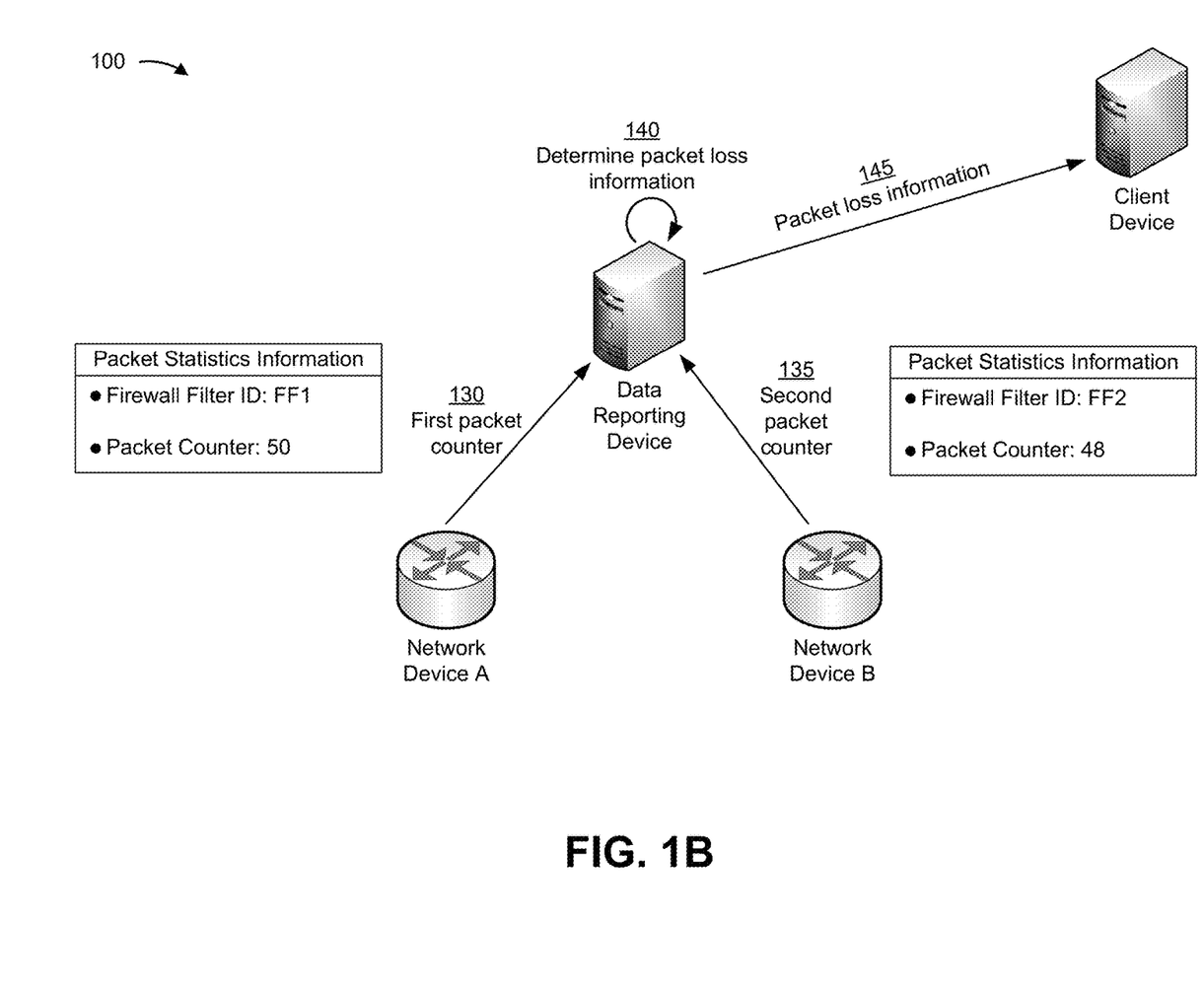

FIGS. 1A and 1B are diagrams of an overview of an example implementation 100 described herein. As shown in FIGS. 1A and 1B, example implementation 100 shows a first network device utilizing alternating firewall filters, such that the first network device and a second network device may provide packet counters to a data reporting device in a manner that enables the data reporting device to determine packet loss for an IP session being supported by UDP. In practice, any number of two-network device combinations may utilize alternating firewall filters to enable the data reporting device to determine packet loss for IP sessions being supported by UDP.

As shown in FIG. 1A, and by reference number 105, a first network device (shown as Network Device A) may receive, from a UDP source, UDP packets associated with an IP session. For example, the first network device may receive UDP packets associated with an IP session throughout a first time period. As shown by reference number 110, network device A may apply, to each UDP packet of the UDP packets, a first firewall filter (e.g., shown as Firewall Filter 1) and may update a first packet counter to account for a total number of UDP packets to which the first firewall filter has been applied.

In some implementations, prior to receiving the UDP packets, the first network device may be configured with alternating firewall filters. For example, the first network device may be configured with alternating firewall filters that may be used to mark and count UDP packets of the IP session. A firewall filter may be a rule that defines how the first network device and/or the second network device is to mark and/or count a UDP packet. For example, a firewall filter may be a rule allows the first network device and/or the second network to set the one or more bits (e.g., type of service (ToS) bits) of the UDP packets to particular bit values, such that the one or more bits of the UDP packets allow each UDP packet to be identified in association with a particular firewall filter.

In some implementations, the first network device may determine to apply the first firewall filter based on a particular combination of IP address information (e.g., a source IP address and a destination IP address) and/or port identifier information (e.g., a source port identifier and a destination port identifier) included in each UDP packet. For example, the first network device may receive a UDP packet, and may analyze a header of the UDP packet to identify IP address information and port identifier information associated with the UDP packet. In this case, the first network device may compare the identified IP address information and/or port identifier information to IP address information and/or port identifier information stored with a data structure to determine which firewall filter to apply. As shown as an example, the first network device may determine to apply the first firewall filter.

In some implementations, the first network device may apply the first firewall filter to each UDP packet of the UDP packets by setting a particular ToS bit in each UDP packet to a particular value to allow each UDP packet to be counted as a UDP packet to which the first firewall filter has been applied. As shown as an example, the first network device may apply the first firewall filter to each UDP packet by setting a ToS bit associated with each UDP packet to a bit value of one (e.g., shown as the sixth ToS bit of the eight available ToS bits).

Additionally, the first network device may update the first packet counter. For example, the first network device may update the first packet counter each time a UDP packet is received to account for a total number of UDP packets to which the first firewall filter has been applied. As shown as an example, the UDP packets may include fifty UDP packets, and the first network device may update the first packet counter to fifty (e.g., iteratively, each time a UDP packet is received).

As shown by reference number 115, the first network device may send the UDP packets to the second network device. As shown by reference number 120, the second network device may update a second packet counter to account for a total number of UDP packets to which the first firewall filter has been applied and which have been received by the second network device. For example, the second network device may compare a bit value of a UDP packet, of the UDP packets, to bit values stored (e.g., by a data structure) in association with a firewall filter name (shown as FF1 for Firewall Filter 1 and FF2 for Firewall Filter 2). In this case, the second network device may, based on the comparison, determine that the UDP packet is associated with the first firewall filter, and may update the second packet counter that is associated with the first firewall filter.

As shown by reference number 125, the second network device may send the UDP packets to the UDP sink. In some cases, the second network device may revert each UDP packet back to an original state (e.g., by resetting one or more ToS bits to a state the bits were in prior to each UDP packet being received by the first network device).

In this way, the first network device and the second network device are able to count UDP packets using the first firewall filter.

As shown in FIG. 1B, and by reference number 130, the first network device may send the first packet counter to the data reporting device. As shown by reference number 135, the second network device may send the second packet counter to the data reporting device. The first packet counter and/or the second packet counter may include, in addition to a packet counter (e.g., a bit count, a byte count, etc.), a firewall filter identifier to identify each firewall filter (e.g., shown as FF1 and FF2 for Firewall Filter 1 and Firewall Filter 2, respectively).

In some cases, the first network device and/or the second network device may be configured to send packet counters to the data reporting device periodically throughout the first time period (e.g., every n seconds until the first time period passes). In this case, the packet counters may be accumulated each time a packet counter is provided to the data reporting device. As an example, if the first time period that identifies the duration of the first firewall filter is set to thirty seconds, and the first and second network devices are configured to provide packet counters to the data reporting device every five seconds, then the first and second network device may provide packet counters to the data reporting device after the first five seconds, after the first ten seconds, after the first fifteen seconds, etc., until the thirty second duration of the first firewall filter has expired.

As shown by reference number 140, the data reporting device may determine packet loss information for the IP session for the first time period. For example, the data reporting device may, at a threshold time period after the first time period, such a time period after which the data reporting device starts receiving packet counters associated with the second firewall filter, determine packet loss information by comparing the first packet counter and the second packet counter, such that a difference between the first packet counter and the second packet counter may correspond to packet loss throughout the first time period. By determining the packet loss information for the first time period after starting to receive packet counters associated with the second firewall filter, the data reporting device ensures that all packet counters associated with the first firewall filter have been received, and thus is able to determine that any discrepancy between the first packet counter and the second packet counter is caused by packet loss (and not packet delay).

As shown by reference number 145, the data reporting device may report the packet loss information to a client device. For example, a client device may be associated with a manager or software developer of an organization that owns a program sending traffic via the IP session, and may receive the packet loss information to ensure that a particular standard of quality assurance is being satisfied and/or to perform any actions that may be needed to prevent subsequent packet loss from occurring.

In this way, the first network device and the second network device are able to report packet counters to the data reporting device to allow the data reporting device to determine packet loss information for the IP session.

As indicated above, FIGS. 1A and 1B are provided merely as an example. Other examples are possible and may differ from what was described with regard to FIGS. 1A and 1B. For example, there may be additional devices and/or networks, fewer devices and/or networks, different devices and/or networks, or differently arranged devices and/or networks than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) of example implementation 100 may perform one or more functions described as being performed by another set of devices of example implementation 100.

Figure 2:
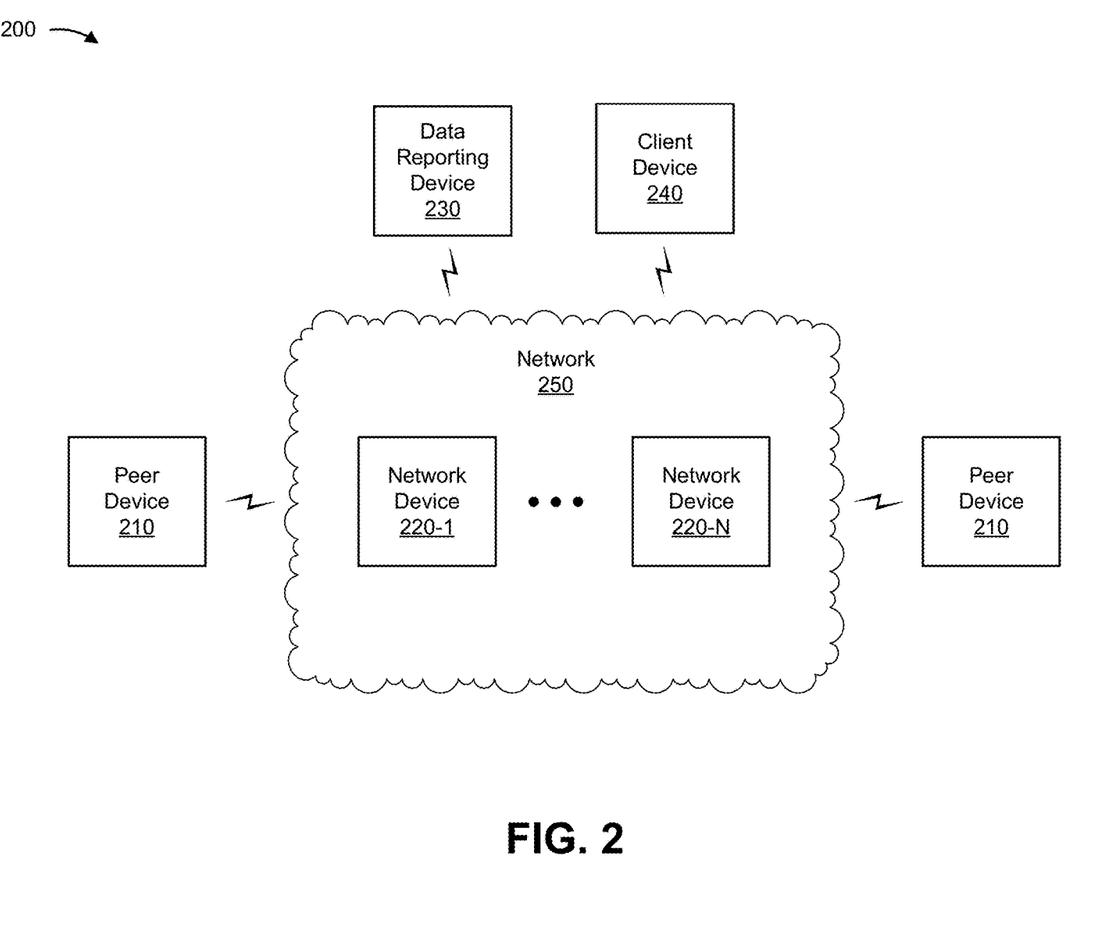
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a peer device 210, a network device 220, a data reporting device 230, a client device 240, and/or a network 250. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a switch, a gateway, a firewall, a hub, a bridge, a reverse proxy device, a server device (e.g., a proxy server, a server executing a virtual machine, etc.), a security device, an intrusion detection device, a load balancer device, or a similar device. In some implementations, peer device 210 may be an endpoint device, such as a computer device, that is a source for network traffic and/or that is a destination for network traffic. For example, peer device 210 may provide UDP packets to a first network device 220. As another example, peer device 210 may receive UDP packets from a second network device 220.

Network device 220 includes one or more devices (e.g., one or more traffic transfer devices) capable of processing and transferring network traffic between peer devices 210. For example, network device 220 may include a router, a switch, a gateway, a firewall, a hub, a bridge, a reverse proxy device, a server device (e.g., a proxy server, a server executing a virtual machine, etc.), a security device, an edge device, an intrusion detection device, a load balancer device, or a similar device. In some implementations, network device 220 may be a physical device implemented within a housing, such as a chassis. In implementations, network device 220 may be a virtual device implemented by one or more computer devices of a cloud computing environment or a data center. In some implementations, a first network device 220 may provide UDP packets to a second network device 220. In some implementations, the first network device 220 and/or the second network device 220 may provide packet counters to data reporting device 230.

Data reporting device 230 includes one or more devices capable of receiving, storing, processing, generating, and/or providing information associated counting packets and/or packet loss. For example, data reporting device 230 may include a server device, a group of server devices, a desktop computer, a laptop computer, a mobile device, or a similar type of device. In some implementations, data reporting device 230 may provide packet loss information to client device 240.

Client device 240 includes one or more devices capable of receiving, generating, storing, processing, and/or providing information associated with an organization. For example, client device 240 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network 250 may include one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, such as a virtual private network (VPN), an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
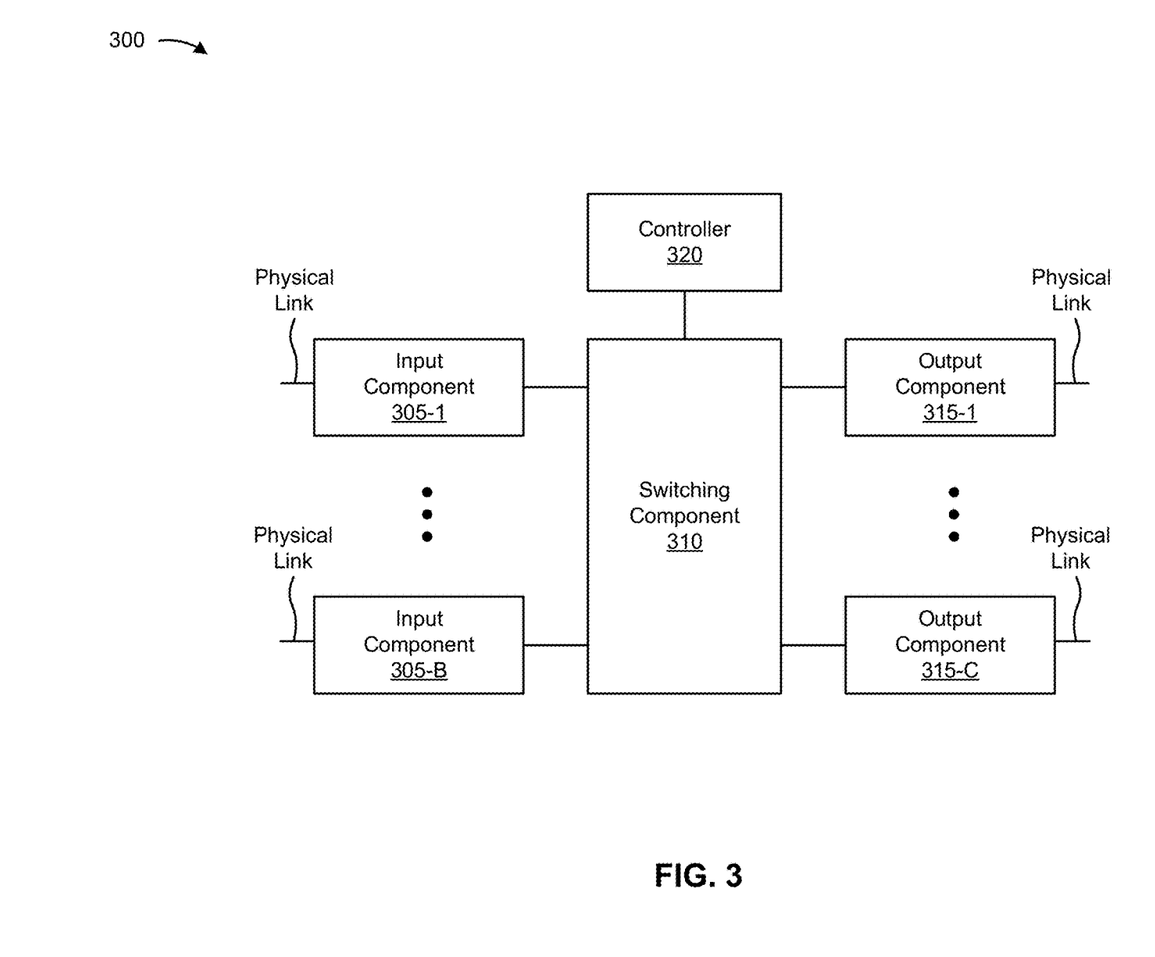
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include a set of input components 305, a switching component 310, a set of output components 315, and/or a controller 320. In some implementations, components of devices 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that may interpret and/or execute instructions. A processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
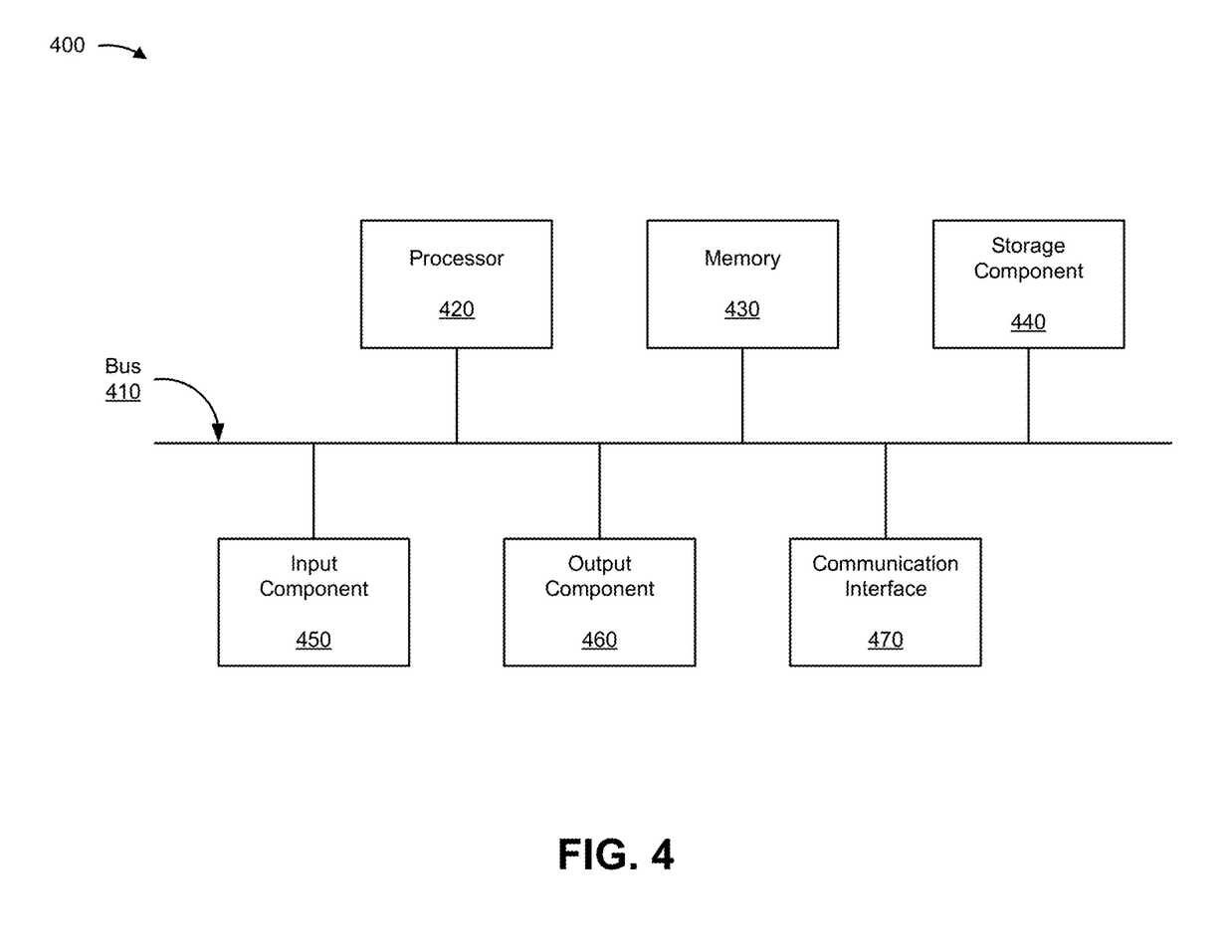
FIG. 4 is a diagram of example components of one or more devices of FIG. 2.

FIG. 4 is a diagram of example components of a device 400. Device 400 may correspond to data reporting device 230 and/or client device 240. In some implementations, data reporting device 230 and/or client device 240 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in location of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
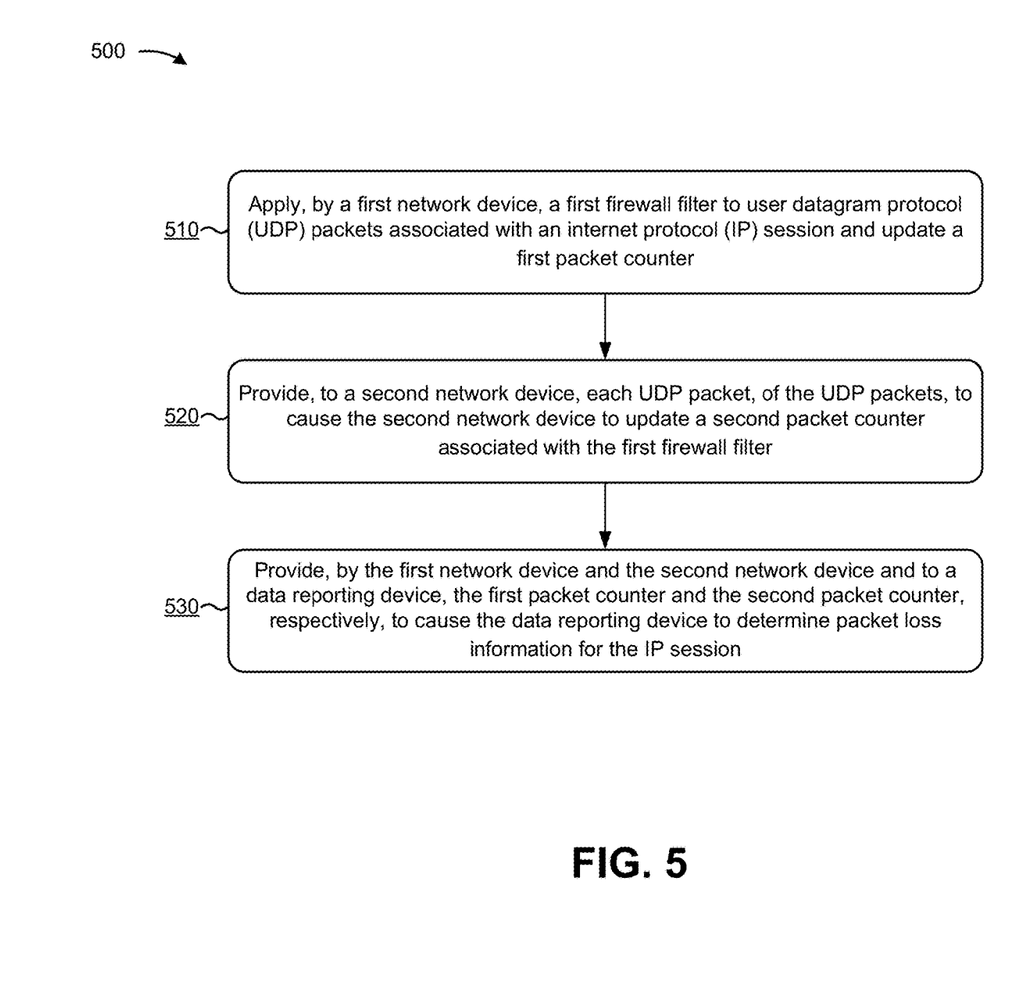
FIG. 5 is a flow chart of an example process for using alternating firewall filters to count user datagram protocol (UDP) packets, such that the counted UDP packets may be used to determine packet loss information for an internet protocol (IP) session.

FIG. 5 is a flow chart of an example process 500 for using alternating firewall filters to count user datagram protocol (UDP) packets, such that the counted UDP packets may be used to determine packet loss information for an internet protocol (IP) session. In some implementations, one or more process blocks of FIG. 5 may be performed by a first network device 220. In some implementations, one or more process blocks of FIG. 5 may be performed by another device or a group of devices separate from or including the first network device 220, such as a first peer device 210, a second peer device 210, a second network device 220, data reporting device 230, and/or client device 240.

As shown in FIG. 5, process 500 may include applying, by a first network device, a first firewall filter to user datagram protocol (UDP) packets associated with an internet protocol (IP) session and updating a first packet counter (block 510). For example, a first network device 220 (e.g., controller 320, input component 305, output component 315, and/or the like) may receive, from a UDP source (e.g., a first peer device 210), UDP packets associated with an IP session between the UDP source and a UDP sink (e.g., a second peer device 210). In this case, the first network device 220 may, for each UDP packet, of the UDP packets, apply a first firewall filter to allow each UDP packet to be counted as a UDP packet to which the first firewall filter has been applied.

In some implementations, prior to receiving the UDP packets, the first network device 220 may be configured with alternating firewall filters. For example, the first network device 220 may be configured with alternating firewall filters that may be used to mark and count UDP packets of the IP session. A firewall filter may be a rule that defines how the first network device 220 and/or the second network device 220 is to mark and/or count a UDP packet. For example, a firewall filter may be a rule allows the first network device 220 and/or the second network device 220 to set the one or more bits (e.g., type of service (ToS) bits) of the UDP packets to particular bit values, such that the one or more bits of the UDP packets allow each UDP packet to be identified in association with a particular firewall filter.

As an example, the first network device 220 may be configured with two alternating firewall filters, such as a first firewall filter and a second firewall filter. In this example, the first network device 220 may apply the first firewall filter to UDP packets received throughout a first time period and may apply the second firewall filter to UDP packets received throughout a second time period (e.g., such that one of the two firewall filters is always being applied to UDP packets of the IP session). Additionally, each firewall filter may set a bit to a bit value that is different than a bit value associated with UDP that were set using the first firewall filter. In practice, a network device 220 may support alternating firewall filters for up to sixty four different firewall filters (e.g., based on an available number of DSCP bits).

In some cases, a number of firewall filters used by the first network device 220 and/or the second network device 220 may be associated with a number of bits reserved for counting UDP packets. For example, if one bit is reserved for counting UDP packets, each network device 220 may have two different alternating firewall filters (e.g., a first firewall filter where the one bit has a bit value of one and a second firewall filter where the one bit has a bit value of zero). As another example, if two bits are reserved for counting UDP packets, each network device 220 may have up to four different alternating firewall filters (e.g., a firewall filter associated with a bit combination of 00, a firewall filter associated with a bit combination of 01, a firewall filter associated with a bit combination of 10, and a firewall filter associated with a bit combination of 11).

In some implementations, the first network device 220 may receive UDP packets associated with the IP session. For example, the first network device 220 may receive UDP packets associated with the IP session periodically throughout the first time period.

In some implementations, the first network device 220 may determine to apply the first firewall filter to each UDP packet of the UDP packets. For example, the first network device 220 may analyze a UDP packet to identify IP address information and/or port identifier information included in the UDP packet. In this case, the first network device 220 may compare the IP address information and/or the port identifier information included in the UDP packet to stored IP address information and/or port identifier information (e.g., stored with a data structure) to determine that the first firewall filter is to be applied to the UDP packet.

In some implementations, the first network device 220 may apply the first firewall filter to each UDP packet of the UDP packets. For example, the first network device 220 may apply the first firewall filter by setting a particular ToS bit in a UDP packet to a particular value to allow the UDP packet to be counted as a UDP packet to which the first firewall filter has been applied.

As an example, a UDP packet may include a ToS field with a Differentiated Services Code Point (DSCP) field and an explicit congestion notification (ECN) field, whereby the DSCP field has six ToS bits and the ECN field has two ToS bits (e.g., the bits may be configured to the value zero). In this case, the first network device 220 may receive the UDP packet from the UDP source, and may determine that a first firewall filter is to be applied to the UDP packet. Additionally, the first network device 220 may apply the first firewall filter by setting a ToS bit (e.g., a bit, of the six DSCP bits, may be reset from a value of zero to a value of one).

In some implementations, the first network device 220 may update the first packet counter. For example, the first network device 220 may update the first packet counter to account for a total number of UDP packets to which the first firewall filter has been applied.

In this way, the first network device 220 is able to apply a first firewall filter to UDP packets and may update a first packet counter to reflect a total number of UDP packets to which the first firewall filter has been applied.

As further shown in FIG. 5, process 500 may include providing, to a second network device 220, each UDP packet, of the UDP packets, to cause the second network device 220 to update a second packet counter associated with the first firewall filter (block 520). For example, the first network device 220 (e.g., controller 320, input component 305, output component 315, and/or the like) may provide, to the second network device 220, each UDP packet of UDP packets. In this case, the second network device 220 may analyze each UDP packet and may update a second packet counter.

In some implementations, prior to receiving the set of UDP packets, the second network device 220 may be configured with a data structure that associates firewall filters with bit values (e.g., particular ToS bit values). For example, the second network device 220 may be configured with firewall filters that represent all (or some) possible combinations of bits used reserved for marking UDP packets, as described elsewhere herein.

In some implementations, the second network device 220 may update the second packet counter. For example, the second network device 220 may compare one or more particular bit values of a UDP packet to bit values stored by a data structure (e.g., the data structure may associate bit values to firewall filter identifiers). In this case, the second network device 220 may determine that the UDP packet is associated with the first firewall filter if the one or more particular bit values of the UDP packet match one or more bit values stored by the data structure. Here, the second network device 220 may update the second packet counter based on determining that the UDP packet is associated with the first firewall filter.

In some implementations, the second network device 220 may send the UDP packets to a UDP sink (e.g., the second peer device 210). In some cases, the second network device 220 may revert each UDP packet back to an original state by resetting one or more bits to a state that the bits were in prior to each UDP packet being received by the first network device 220.

In this way, the second network device 220 is able to update, for each UDP packet, a second packet counter associated with the first firewall filter.

As further shown in FIG. 5, process 500 may include providing, by the first network device and the second network device and to a data reporting device, the first packet counter and the second packet counter, respectively, to cause the data reporting device to determine packet loss information for the IP session (block 530). For example, the first network device 220 may provide the first packet counter to data reporting device 230, and the second network device 220 may provide the second packet counter to data reporting device 230. In this case, data reporting device 230 may determine packet loss information for the IP session for the first time period (e.g., the time period associated with a duration of the first firewall filter), and may provide the packet loss information to client device 240.

In some implementations, the first network device 220 and/or the second network device 220 may be configured to send packet counters to data reporting device 230 periodically throughout the first time period. In this case, the packet counters may be reset each time a packet counter is provided to data reporting device 230. As an example, if the first time period that identifies the duration of the first firewall filter is set to thirty seconds, and the first and second network devices 220 are configured to provide packet counters to data reporting device 230 every five seconds, then the first and second network device 220 may provide packet counters to the data reporting device after the first five seconds, after the first ten seconds, after the first fifteen seconds, etc., until the thirty second duration of the first firewall filter has expired.

In some implementations, data reporting device 230 may determine packet loss information. For example, data reporting device 230 may compare the first packet counter to the second packet counter, such that a difference between the first packet counter and the second packet counter may identify packet loss throughout the first time period.

In some cases, data reporting device 230 may receive the first packet counter and the second packet counter periodically throughout the first time period. In this case, data reporting device 230 may determine a first aggregate packet counter for UDP packets associated with the first packet counter and may determine a second aggregate packet counter for UDP packets associated with the second packet counter, and may determine the packet loss information based on aggregate totals of the first packet counter and the second packet counter.

In some implementations, data reporting device 230 may determine packet loss information at a threshold time period after the first time period. For example, data reporting device 230 may determine packet loss information at a time period after which data reporting device 230 starts receiving packet counters associated with the second firewall filter. By determining the packet loss information for the first time period after starting to receive packet counters associated with the second firewall filter, data reporting device 230 uses receipt of packet counters associated with the second firewall filter as an indicator that all packet counters associated with the first firewall have been received, and thus is able to determine that any discrepancy between the first packet counter and the second packet counter is caused by packet loss (and not packet delay).

In some implementations, data reporting device 230 may provide the packet loss information to client device 240. For example, data reporting device 230 may provide the packet loss information to client device 240 to alert a manager or a software developer of an organization that owns the program sending data via the IP session of packet loss.

In some implementations, the first network device 220 may continue to apply alternating firewall filters throughout a duration of the IP session. For example, the first network device 220 may, after the first time period associated with the first firewall filter passes, apply the second firewall filter to each additional UDP packet of additional UDP packets associated with the IP session. In this case, the second firewall filter may set one or more bits of each additional UDP packet, such that the one or more bits are different values than the one or more bits associated with the UDP packets that were set using the first firewall filter. In this way, data reporting device 230 is able to effectively identify all UDP packet associated with a particular time period, thereby allowing data reporting device 230 to be able to count packet loss (and not packet delay).

In this way, the first network device 220 and the second network device 220 are able to provide packet counters to data reporting device 230 that may be used to determine packet loss for the IP session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, the first network device 220 and the second network device 220 enable data reporting device 230 to report packet loss (e.g., to a client device) for an IP session of a program that is being supported with UDP. Additionally, by detecting packet loss, the first network device 220 and the second network device 220 improve overall stability of the IP session of the program that is being supported by UDP, alert program managers of packet loss such that issues may be corrected to minimize subsequent packet loss, conserves processing resources that might otherwise be used to resend UDP packets, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, and/or a combination of hardware and software.

Some implementations described herein associate packet counters with a particular numbering scheme. For example, some implementations describe a first packet counter in association with a first network device 220 counting UDP packets of a first firewall filter, and describe a second packet counter in association with a second network device 220 counting UDP packets of the first firewall filter. In this case, the numbering scheme referenced may differentiate between packet counters for the same firewall filter as recorded by each respective network device 220.

In some implementations, the numbering scheme may differentiate between packet counters of different firewall filters. For example, some implementations describe a third packet counter in association with the first network device 220 counting UDP packets of a second firewall filter, and describe a fourth packet counter in association with the second network device 220 counting UDP packets of the second firewall filter. In this case, the numbering scheme is simply to differentiate between each network devices 220 packet counter as applied to particular firewall filters.

In some implementations, a network device 220 may have a packet counter for each firewall filter. For example, if a network device 220 has 64 firewall filters, the network device 220 may have 64 different packet counters that may be used to count UDP packets associated with each firewall filter.

In some implementations, a network device 220 may utilize firewall filters for each UDP traffic flow. For example, if a first network device 220 and a second network device 220 process UDP traffic flow for ten different UDP source/destination pairs, then UDP traffic flow for each UDP source/destination pair may utilize up to 64 different firewall filters.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors, to:
receive user datagram protocol (UDP) traffic flow associated with an internet protocol (IP) session,
the UDP traffic flow including a set of UDP packets;
apply a first firewall filter to each UDP packet of the set of UDP packets,
where, when applying the first firewall filter, the one or more processors are to:
set one or more bits of each UDP packet of the set of UDP packets to one or more particular bit values to allow each UDP packet to be identified in association with the first firewall filter, and
the first firewall filter to be applied during a first time period;
update, each time a UDP packet of the set of UDP packets is received, a first packet counter to account for a total number of UDP packets to which the first firewall filter has been applied;
provide, to another network device, each UDP packet of the set of UDP packets,
the other network device to update a second packet counter to account for a total number of UDP packets to which the first firewall filter has been applied and which have been received by the other network device; and
provide the first packet counter to a server device,
the other network device to provide the second packet counter to the server device, and
where, at a threshold time period after the first time period, the server device determines packet loss information for the IP session for the first time period, and
where the server device, by comparing only packet counters associated with the first firewall filter, is able to differentiate between packet loss and at least one of:
packet delay, or a UDP source device stopping transmission of the UDP traffic flow;
provide, after the first time period, a third packet counter to the server device,
the third packet counter being associated with counting additional UDP packets that have been counted in association with a second firewall filter,
the other network device to provide a fourth packet counter to the server device that is associated with counting additional UDP packets that have been counted in association with the second firewall filter and that have been received by the other network device,
where the server device uses the fourth packet counter as an indicator that all packet counters associated with the first firewall filter have been received; and
alternate between the first firewall filter and at least the second firewall filter,
where the first firewall filter is applied during the first time period, and the at least the second firewall filter is to be applied during one or more additional time periods.

2. The network device of claim 1, where the one or more processors are further to:

compare, after receiving a UDP packet of the set of UDP packets, IP address information and/or port identifier information included in the UDP packet to IP address information and/or port identifier information that is stored by a data structure;

determine to apply the first firewall filter based on the IP address information and/or the port identifier information of the UDP packet matching the IP address information and/or the port identifier information that is stored by the data structure; and where the one or more processors, when applying the first firewall filter, are to:
set a type of service (ToS) bit associated with the UDP packet to a first value,
the first value to allow the other network device to identify the UDP packet as being associated with the first firewall filter.

3. The network device of claim 1, where the one or more processors, when providing each UDP packet, of the set of UDP packets, to the other network device, are to:
provide a UDP packet, of the set of UDP packets, to the other network device,
the other network device to compare one or more particular bit values of the UDP packet, of the set of UDP packets, to bit values stored by a data structure,
the other network device to determine that the UDP packet, of the set of UDP packets, is associated with the first firewall filter based on comparing the one or more particular bit values of the UDP packet, of the set of UDP packets, to the bit values stored by the data structure, and
the other network device to update the second packet counter based on determining that the UDP packet, of the set of UDP packets, is associated with the first firewall filter.

4. The network device of claim 1, where the one or more processors, when providing the first packet counter to the server device, are to:
provide the first packet counter to the server device periodically throughout the first time period,
where the first packet counter is to reset each time the first packet counter is provided to the server device,
where the other network device is to provide, periodically throughout the first time period, the second packet counter to the server device and where the second packet counter is to reset each time the second packet counter is provided to the server device,
where the server device is to determine a first aggregate packet counter for the UDP packets associated with the first packet counter and a second aggregate packet counter for the UDP packets associated with the second packet counter, and
where the server device is to determine the packet loss information for the first time period by comparing the first aggregate packet counter and the second aggregate packet counter.

5. The network device of claim 1, where the one or more processors are further to:
receive, after the first time period, additional UDP packets associated with the IP session;
apply the second firewall filter to each additional UDP packet of the additional UDP packets,
where, when applying the second firewall filter, the one or more processors are to:
set one or more bits of each additional UDP packet of the additional UDP packets,
where the one or more bits of each additional UDP packet are set to values that are different than values used for the one or more bits associated with the UDP packets that were set using the first firewall filter;
update, each time an additional UDP packet of the additional UDP packets is received, the third packet counter to account for a total number of additional UDP packets to which the second firewall filter has been applied;
provide each additional UDP packet of the additional UDP packets to the other network device,
the other network device to update the fourth packet counter to account for a total number of UDP packets to which the second firewall filter has been applied and which have been received by the other network device; and
provide the third packet counter to the server device,
the other network device to provide the fourth packet counter to the server device, and
where the server device determines the packet loss information for the first time period after receiving the fourth packet counter from the other network device.

6. The network device of claim 1, where the one or more processors are further to:
provide the first packet counter to the server device to allow the server device to determine the packet loss information,
where the server device is to provide the packet loss information to a client device that is associated with an organization that supports a program that is using the IP session to send the UDP packets.

7. A system comprising:
a first network device to:
receive user datagram protocol (UDP) traffic flow associated with an internet protocol (IP) session,
the UDP traffic flow including a set of UDP packets;
apply a first firewall filter to each UDP packet of the set of UDP packets,
where, when applying the first firewall filter, the first network devices is to:
set one or more bits of each UDP packet of the set of UDP packets to one or more particular bit values to allow each UDP packet to be identified in association with the first firewall filter, and
the first firewall filter to be applied during a first time period, and
update, each time a UDP packet of the set of UDP packets is received, a first packet counter to account for a total number of UDP packets to which the first firewall filter has been applied; and
alternate between the first firewall filter and one or more additional firewall filters,
where the first firewall filter is applied during the first time period and the one or more additional firewall filters are to be applied during one or more additional time periods;
a second network device to:
receive, from the first network device, each UDP packet of the set of UDP packets, and
update a second packet counter to account for a total number of UDP packets to which the first firewall filter has been applied and which have been received by the second network device; and a server device to:
  receive the first packet counter from the first network device,
  receive the second packet counter from the second network device, and
  determine packet loss information for the IP session for the first time period based on the first packet counter and the second packet counter,
    where the server device, by comparing only packet counters associated with the first firewall filter, is able to differentiate between packet loss and at least one of:
      packet delay, or
      a UDP source device stopping transmission of the UDP traffic flow;
  receive, after the first time period, a third packet counter from the first network device,
    the third packet counter being associated with counting additional UDP packets that have been counted in association with a second firewall filter;
  receive, after the first time period, a fourth packet counter from the second network device,
    the fourth packet counter being associated with counting additional UDP packets that have been counted in association with the second firewall filter and that have been received by the second network device; and
  determine the packet loss information for the first time period after receiving the fourth packet counter from the other network device.

8. The system of claim 7, where the first network device is further to:
  compare, after receiving a UDP packet of the set of UDP packets, IP address information and/or port identifier information included in the UDP packet to IP address information and/or port identifier information that is stored by a data structure; and
  determine to apply the first firewall filter based on the IP address information and/or the port identifier information of the UDP packet matching the IP address information and/or the port identifier information that is stored by the data structure.

9. The system of claim 7, where the second network device, when updating the second packet counter, is to:
  compare, before updating the second packet counter, one or more particular bit values of a UDP packet, of the set of UDP packets, to bit values stored by a data structure,
  determine that the UDP packet, of the set of UDP packets, is associated with the first firewall filter based on comparing the one or more particular bit values of the UDP packet, of the set of UDP packets, to bit values stored by the data structure, and
  update the second packet counter based on determining that the UDP packet, of the set of UDP packets, is associated with the first firewall filter.

10. The system of claim 7, where the server device, when determining the packet loss information, is to:
  compare the first packet counter and the second packet counter,
  determine that the first packet counter is not equal to the second packet counter, and
  use a difference between the first packet counter and the second packet counter as a packet loss value included in the packet loss information.

11. The system of claim 7, where the server device is further to:
  provide the packet loss information to a client device that is associated with an organization that supports a program that is using the IP session to send the UDP packets.

12. The system of claim 7, where the first network device, when applying the first firewall filter, is further to:
  set a type of service (ToS) bit associated with each UDP packet to a first value,
    the first value to allow the other network device to identify the UDP packet as being associated with the first firewall filter.

13. The system of claim 7, where the first network device, when applying the first firewall filter, is further to:
  provide the first packet counter to the server device periodically throughout the first time period,
  where the first packet counter is to reset each time the first packet counter is provided to the server device.

14. A method, comprising:
  receiving, by a network device, user datagram protocol (UDP) traffic flow associated with an internet protocol (IP) session,
    the UDP traffic flow including a set of UDP packets;
  applying, by the network device, a first firewall filter to each UDP packet of the set of UDP packets,
    where applying the first firewall filter includes:
      setting one or more bits of each UDP packet of the set of UDP packets to one or more particular bit values to allow each UDP packet to be identified in association with the first firewall filter, and
    the first firewall filter to be applied during a first time period;
  updating, by the network device, each time a UDP packet of the set of UDP packets is received, a first packet counter to account for a total number of UDP packets to which the first firewall filter has been applied;
  providing, by the network device and to another network device, each UDP packet of the set of UDP packets,
    the other network device to update a second packet counter to account for a total number of UDP packets to which the first firewall filter has been applied and which have been received by the other network device; and
  providing, by the network device, the first packet counter to a server device,
    the other network device to provide the second packet counter to the server device, and
      where the server device determines packet loss information for the IP session for the first time period based on the first packet counter and the second packet counter;
  providing, by the network device and after the first time period, a third packet counter to the server device,
    where the third packet counter is associated with counting additional UDP packets that have been counted in association with a second firewall filter,
    where the other network device is to provide a fourth packet counter to the server device that is associated with counting additional UDP packets that have been counted in association with the second firewall filter and that have been received by the other network device, and
    where the server device uses the fourth packet counter as an indicator that all packet counters associated with the first firewall filter have been received; and
  alternating, by the network device, between the first firewall filter and at least the second firewall filter, where the first firewall filter is applied during the first time period, and the at least the second firewall filter is to be applied during one or more additional time periods.

15. The method of claim 14, where providing the first packet counter to the server device comprises:
providing the first packet counter to the server device,
where, at a threshold time period after the first time period, the server device determines the packet loss information for the IP session for the first time period, and
where the server device, by comparing only packet counters associated with the first firewall filter, is able to differentiate between packet loss and at least one of:
packet delay, or
a UDP source device stopping transmission of the UDP traffic flow.

16. The method of claim 14, where applying the first firewall filter comprises:
setting a type of service (ToS) bit associated with the UDP packet to a first value,
the first value to allow the other network device to identify the UDP packet as being associated with the first firewall filter.

17. The method of claim 14, where providing the first packet counter to the server device comprises:
providing the first packet counter to the server device periodically throughout the first time period,
where the first packet counter is to reset each time the first packet counter is provided to the server device,
the other network device to provide the second packet counter to the server device periodically throughout the first time period, where the second packet counter is to reset each time the second packet counter is provided to the server device, and
the server device to determine the packet loss information based on aggregate totals of the first packet counter and the second packet counter.

18. The method of claim 14, where providing the first packet counter to the server device comprises:
providing the first packet counter to the server device to allow the server device to determine the packet loss information,
where the server device is to provide the packet loss information to a client device that is associated with an organization that supports a program that is using the IP session to send the UDP packets.

19. The method of claim 14, where applying the first firewall filter comprises:
comparing, after receiving a UDP packet of the set of UDP packets, IP address information and/or port identifier information included in the UDP packet to IP address information and/or port identifier information that is stored by a data structure; and
applying the first firewall filter based on the IP address information and/or the port identifier information of the UDP packet matching the IP address information and/or the port identifier information that is stored by the data structure.

20. The method of claim 14, where the server device, when determining the packet loss information, is to:
compare the first packet counter and the second packet counter,
determine that the first packet counter is not equal to the second packet counter, and
use a difference between the first packet counter and the second packet counter as a packet loss value included in the packet loss information.

* * * * *